United States Patent
De Jongh

[15] 3,673,225

[45] June 27, 1972

[54] NEW 7-ALKYL-STEROIDS

[72] Inventor: Hendrik Paul De Jongh, Oss, Netherlands

[73] Assignee: Organon Inc., West Orange, N.J.

[22] Filed: Jan. 16, 1970

[21] Appl. No.: 3,516

[52] U.S. Cl. ..........................................260/397.5, 260/397.3
[51] Int. Cl. ......................................................C07c 169/20
[58] Field of Search ................................................260/397.5

[56] References Cited

UNITED STATES PATENTS

| 3,383,393 | 5/1968 | De Jongh | 260/397.5 |
| 3,522,281 | 7/1970 | Anner et al. | 260/397.5 |

*Primary Examiner*—Elbert L. Roberts
*Attorney*—Hugo E. Weisberger

[57] ABSTRACT

The present invention relates to a group of novel $7\alpha,18$-dialkyl-steroids of the oestrane series having a double bond originating from carbon atom 5, which compounds have strong oestrogenic, ovulation-inhibiting and antifertilization properties.

3 Claims, No Drawings

NEW 7-ALKYL-STEROIDS

The invention relates to a process for the production of new 3-desoxo-19-nor-steroids.

The majority of the known steroids are compounds having a methyl group in the 10- and 13-positions.

It is common knowledge that removal of the 10-methyl group often results in compounds having an enhanced biological activity. As regards the 13-methyl group, however, the reverse is often the case, viz., alkylation of this group (18-homo-steroids) gives compounds having a greater biological activity. Based on these principles a number of compounds have already been developed and described in the literature.

By the process of the present invention a new group of compounds has now been prepared of the general formula:

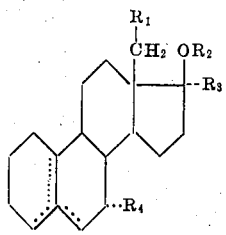

in which

R$_1$ = an alkyl group with one–three C-atoms,
R$_2$ = hydrogen, an acyl group or an ether group,
R$_3$ = hydrogen or a lower alkyl, alkenyl or alkynyl group with one–six C-atoms, or
OR$_2$ + R$_3$ form together a keto group,
R$_4$ = an alkyl group with one–four C-atoms, and
in which there is a double bond starting from carbon atom 5.

These compounds have proved to be very valuable on account of their progestative, anabolic, androgenic, oestrogenic, ovulation-inhibiting, and antifertilization properties.

The compounds according to the invention are prepared by starting from the corresponding in the 3-position oxygenated compounds, which at the 17-position may already possess the substituents indicated in the above formula, and reductive splitting off of the 3-substituent, and then introducing, if desired, the substituents indicated at the 17-position by any method known per se.

If a Δ$^4$- or Δ$^{5(10)}$-3-keto-steroid is used as starting product the 3-keto group should preferably be split off by first converting this group into a 3-thioketal group and then splitting off the latter group reductively by treating it with an alkali metal in the presence of liquid ammonia or a lower aliphatic primary amine.

The thioketalization can be performed in various manners. One of the conventional methods consists in that the 3-keto compound is reacted with a mercaptan or dithiol in the presence of BF$_3$ or the etherate thereof, or in the presence of zinc chloride, or with hydrochloric acid in the presence of a dehydrating agent, such as sodium sulphate.

The reaction is usually performed in the presence of an organic solvent which should preferably consist of a lower aliphatic carboxylic acid, such as acetic acid, which especially applies to the Δ$^{5(10)}$- steroids.

The reductive splitting off of the 3-thioketal of the thus prepared cyclic or non-cyclic thioketal compounds is performed by first dissolving the relative steroid, if desired, in a suitable solvent, such as an aliphatic ether, dioxan or tetrahydrofuran, and reacting this solution with an alkali metal and liquid ammonia or a lower aliphatic primary amine, such as methyl amine or ethyl amine.

The preferred alkali metal is lithium.

For the production of Δ$^{5(6)}$-steroids according to the invention it is also possible to follow the thioketal route described above, but it is preferred to start with the corresponding 3-hydroxy-steroids, the 3-hydroxyl group of which is converted to the corresponding 3-halo or 3-sulfonyloxy compound by halogenation or sulfonylation, after which the 3-substituent is split off reductively by treatment with an alkali metal in liquid ammonia, a lower aliphatic primary amine, or in an alcohol, such as ethanol, or by treatment with an aluminium hydride, such as an alkali metal aluminium hydride, e.g. lithium aluminium hydride.

As halogenating agents can be used: phosphortrichloride, phosphorpentachloride, thionylchloride, phosphoroxychloride, phosphortribromide, phosphorpentabromide, thionylbromide, and the like.

The sulfonylation is performed by reacting the 3-hydroxysteroid with a sulfonic acid or a functional derivative thereof, such as a halide.

As sulfonic acids can be used aliphatic, aromatic or araliphatic sulfonic acids, such as methane sulfonic acid, benzene sulfonic acid, toluene sulfonic acid, and the like.

The intermediate products obtained in the production of the Δ$^5$-3-desoxo-steroids in question are also valuable as such on account of their anabolic, progestative and ovulation-inhibiting properties.

Therefore the invention also relates to the production of this group of new products of the general formula:

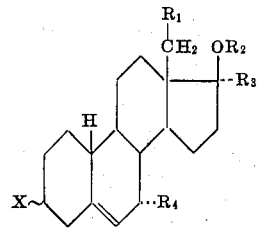

in which
R$_1$, R$_2$, R$_3$ and R$_4$ have the meaning indicated above, and
X = a halogen atom or a sulfonyloxy group.

For the production of these compounds a compound of the formula:

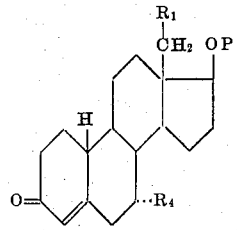

in which

R$_1$ and R$_4$ have the meaning indicated above, and
P = an ester or ether group, which is hydrolyzed less readily than the 3-acyl group to be introduced after this, should preferably be used as starting product.

Such a compound is converted in the conventional manner into a 3-enolacylate, followed by reduction of the double bond between the carbon atoms 3 and 4, e.g. by treating it with an alkali metal borohydride and then converting it into a Δ$^5$-3-halo or 3-sulfonyloxy compound by halogenation or sulfonylation, as described before, after which the protected 17-hydroxyl group is converted into a free hydroxyl group by hydrolysis. This protected group, which is to be found in the 17-position, may be an ether group, such as a t.butylether or tetrahydropyranyl ether group, or an ester group, such as a carbonate, trimethyl acetate or benzoate. If desired, the thus obtained Δ$^5$-3-halo or Δ$^5$-3-sulfonyloxy-17β-hydroxy- compound can be converted by oxidation, followed by alkylation, into the 17β-hydroxy-17α-alkyl-(alkenyl or alkynyl) compound and/or, if desired, into the corresponding 17-acyloxy compounds.

As stated before the starting products in the process according to the invention, viz. the in the 3-position oxygenated oestrane compounds, which possess a double bond starting from carbon atom 5, may already possess the substituents at the 17-position as described in the formula of the final products, but these substituents, viz. a 17α-alkyl, alkenyl or alkynyl group, or a 17-ester or ether group, may be introduced after the reductive step, if desired.

The introduction of a saturated or unsaturated alkyl group in the 17-position is performed by oxidizing the 17β-hydroxy-steroid to the corresponding 17-keto compound, usually by the Oppenauer method or with chromium trioxide, and then performing a condensation reaction by adding a metal derivative of a saturated or unsaturated aliphatic hydrocarbon to the relative 17-keto-steroid.

As metal derivative a Grignard compound can be used, for example, the magnesiumbromide of the relative hydrocarbon or an alkyllithium compound. A special performance of it for the production of the 17-hydroxy-17-alkynyl compound, consists in that the 17-keto-steroid is reacted with a triple unsaturated hydrocarbon in the presence of an alkali metal or alkali metal compound, such as an alkali metal amide or an alkali metal alcoholate, or by the addition of a metal compound of a triple unsaturated hydrocarbon, such as an alkali metal or alkaline earth metal compound, to the 17-keto group of the starting product.

The 17-alkylation can also be performed in two phases by first preparing the 17β-hydroxy-17α-alkynyl compound via a condensation reaction and converting this compound into the corresponding 17α-alkenyl or 17α-alkyl compound by reduction, e.g. by means of hydrogen in the presence of a catalyst, such as nickel or Pd/BaSO$_4$.

The hydrocarbon radical which may be present in the final products in 17-position are saturated or unsaturated aliphatic hydrocarbon groups having one–six carbon atoms, for example, a methyl, ethyl, propyl, butyl, isopropyl, vinyl, propenyl, allyl, methallyl, ethynyl, propynyl, propargyl, butynyl, butadienyl, butadiynyl radical.

The secondary or tertiary 17-hydroxy-steroids produced by the processes described above can be esterified or etherified, if desired. In the esterification inorganic acids, such as phosphoric acids or saturated or unsaturated carboxylic acids with one–18 carbon atoms, can be used.

These esters can be prepared by any method known per se by reacting the 17-hydroxy-steroid with the relative acid, or the anhydride or halide thereof, or by reacting the reaction product obtained in the condensation of the 17-keto-steroid with a metal derivative of an unsaturated hydrocarbon radical, with the relative acid or a derivative thereof without previous hydrolysis.

Examples of organic carboxylic acids to be used in the esterification: formic acid, acetic acid, propionic acid, butyric acid, valeric acid, capric acid, undecylic acid, lauric acid, tridecylic acid, myristic acid, pentadecylic acid, oleic acid, palmitic acid, stearic acid, trimethyl acetic acid, diethyl acetic acid, hexahydro benzoic acid, cyclopentyl propionic acid, cyclohexyl butyric acid, cyclohexyl propionic acid, citronelic acid, undecylenic acid, erucic acid, benzoic acid, phenyl acetic acid, phenyl propionic acid, phenyl butyric acid, phenyl propiolic acid, malonic acid, succinic acid, glutaric acid, pimelic acid and tartaric acid.

The 17-ether group can be derived from an aliphatic, aromatic or araliphatic hydrocarbon radical. Preferably an ether is prepared derived from a lower aliphatic hydrocarbon radical, of which especially the alkyl vinylethers, such as the methyl vinylether, ethyl vinylether or butyl vinylether.

The alkyl groups present in 7-, and 18-position are preferably methyl groups.

The compounds according to the invention can be administered parenterally or orally in the form of suspensions, solutions, emulsions or solid pharmaceutical dosage unit forms, such as tablets, pills and coated tablets, usually after having been mixed with auxiliaries.

The invention is illustrated further by the following examples:

EXAMPLE I

To a solution of 1 gm $\Delta^4$-3-keto-7α,18-dimethyl-17β-hydroxy-oestrene in 10 ml methanol are added at 0° C 0.5 ml ethane dithiol and 0.34 ml boron trifluoride etherate. Then this mixture is stirred for 2 ½ hours at room temperature and then poured into a 1N NaOH solution, which solution is extracted with methylene chloride. The extract is dried and evaporated to dryness in vacuo to obtain 1.28 gm crystalline material, which after chromatography over 40 gm silicagel gives 1.15 gm pure $\Delta^4$-7α,18-dimethyl-17β-hydroxy-oestrene-3-ethylene dithioketal.

To a suspension of 0.5 gm sodium in 30 ml liquid ammonia is added dropwise at −70° C a solution of 1 gm of the product obtained above in 10 ml absolute tetrahydrofuran, after which the mixture is stirred for 30 minutes at the same temperature. Then 2 ml absolute ethanol is added. The ammonia is evaporated and the residue poured into 50 ml water. The aqueous mixture is extracted with methylene chloride and the extract washed with water, dried and evaporated in vacuo till nearly dry. Chromatography over 30 gm silicagel gives 0.85 gm $\Delta^4$-7α,18-dimethyl-17β-hydroxy-oestrene.

By esterification of this compound with phenylpropionic acid the corresponding 17-phenylpropionate is prepared. In the same manner the 17-esters have been prepared derived from acetic acid, butyric acid, capric acid and lauric acid.

EXAMPLE II

To a solution of 6.87 gm $\Delta^4$-7α,18-dimethyl-17β-hydroxy-oestrene in 75 ml acetone is added at 10° C a solution of 9.75 ml 8N chromic acid. The mixture is stirred at −10° C for 15 minutes and then poured into 1 liter water. The aqueous mixture is extracted with methylene chloride. The extract is washed with water, dried and evaporated to dryness in vacuo. The residue is chromatographed over 200 gm silicagel to obtain 5.96 gm of the pure $\Delta^4$-7α,18-dimethyl-17-keto-oestrene.

EXAMPLE III

Acetylene is bubbled through a suspension of 9.09 gm potassium-t-butylate in 80 ml tetrahydrofuran water, 2 hours at 0° C. To this suspension is added dropwise at −10° C a solution of 5.7 gm $\Delta^4$-7α,18-dimethyl-17-keto-oestrene in 90 ml absolute tetrahydrofuran, after which again acetylene is bubbled through the mixture for 2 hours. The reaction is decomposed by adding a solution of 6 ml concentrated sulphuric acid in 31 ml water. This mixture is poured into water and extracted with methylene chloride. The extracts are washed with residue dried and evaporated in vacuo, after which the residue is chromatographed over 240 gm silicagel to obtain the $\Delta^4$-7α,18-dimethyl-17β-hydroxy-17α-ethynyl-oestrene.

By esterification this compound is converted into the 17-esters thereof derived from acetic acid, oenanthic acid and phenylpropionic acid.

EXAMPLE IV

EXAMPLE IV

To a solution of 2.2 gm $\Delta^4$-7α,18-dimethyl-17β-hydroxy-17α-ethynyl-oestrene in 66 ml ethylacetate is added 440 mg prehydrated Pd on barium sulphate (5 percent). After 1 mol hydrogen has been taken up the mixture is filtered and the filtrate evaporated to dryness. The residue is chromatographed over silicagel and crystallized from methanol to obtain the $\Delta^4$-7α,18-dimethyl-17β-hydroxy-17α-vinyl-oestrene.

Continuation of the reduction till 2 mol hydrogen has been taken up gives the $\Delta^4$-7α,18-dimethyl-17β-hydroxy-17α-ethyl-oestrene after the process described above.

By esterification of the compounds obtained above the 17-acylates thereof are obtained derived from acetic acid, valeric acid, lauric acid and phenyl propionic acid.

By reacting with ethylvinylether and butylvinylether respectively the two above-mentioned compounds have been converted into the corresponding 17-ethers.

EXAMPLE V

By the processes described in example I and II the $\Delta^4$-3-keto-7$\alpha$-methyl-17$\beta$-hydroxy-18-ethyl-oestrene is converted into the $\Delta^4$-17$\alpha$-methyl-17-keto-18-ethyl-oestrene via the $\Delta^4$-7$\alpha$-methyl-17$\beta$-hydroxy-18-ethyl-oestrene.

To a solution of 3 gm of this compound in 75 ml dry ether an excess of a solution of allylmagnesiumbromide is added in nitrogen atmosphere and while stirring. The mixture is stirred for 2 ½ hours and then poured into acidified water. The aqueous mixture is extracted with ether and processed by the method described in Example III to obtain the $\Delta^4$-7$\alpha$-methyl-17$\beta$-hydroxy-17$\alpha$-allyl-18-ethyl-oestrene.

By replacing the allylmagnesiumbromide by propylmagnesiumbromide, butenylmagnesiumbromide and proparglymagnesiumbromide the corresponding 17$\alpha$-propyl, 17$\alpha$-butenyl and 17$\alpha$-propargyl derivatives are obtained.

By esterification these compounds have been converted into the 17-acylates derived from acetic acid, capric acid and phenylpropionic acid.

The condensation reactions described in this example have also been performed with the $\Delta^4$-7$\alpha$,18-dimethyl-17-keto-oestrene to obtain the corresponding 17$\beta$-hydroxy-17$\alpha$-allyl, 17$\beta$-hydroxy-17$\alpha$-propyl, 17-hydroxy-17$\alpha$-butenyl and 17$\beta$-hydroxy-17$\alpha$-propargyl compounds.

By esterification 17-acylates have been prepared from these compounds derived from acetic acid, capronic acid, phenylpropionic acid, cyclohexyl butyric acid, capric acid and palmitic acid, and by etherification 17-methyl, 17-propyl, 17-hexyl, 17-methylvinyl and 17-butylvinyl-ethers.

EXAMPLE VI

To a solution of 42 gm $\Delta^{5(10)}$-3-keto-7$\alpha$,18-dimethyl-17$\beta$-hydroxyoestrene in 680 ml acetic acid are added at 0° C 14 ml ethane dithiol and 10.4 ml BF$_3$-etherate. Then the mixture is stirred for 3 hours at room temperature, poured into a dilute NaOH solution and then extracted with methylene chloride. The extract is washed, dried and evaporated to dryness in vacuo. The residue is chromatographed to obtain the 3,3-ethylene dithioketal derivative of the starting product.

To a suspension of 13.5 gm lithium in 600 ml dry ethylamine is added at −60° C a solution of 28.76 gm of the compound obtained above in 540 ml dry tetrahydrofuran. The mixture is stirred for 2 hours at −60° C, after which absolute ethanol is added and the ethylamine is removed by evaporation. The residue is poured into water, the aqueous mixture extracted with methylene chloride and the extract washed with water, dried and evaporated to dryness in vacuo. The residue is chromatographed over silicagel to obtain the $\Delta^{5(10)}$-7$\alpha$,18-dimethyl-17$\beta$-hydroxy-oestrene.

By esterification this compound has been converted into the 17-esters derived from acetic acid, propionic acid, phenylpropionic acid and palmitic acid.

By etherification this compound has been converted into the 17-methyl, 17-butyl and 17-ethylvinyl-ethers.

EXAMPLE VII

To a solution of 5 gm $\Delta^{5(10)}$-7$\alpha$,18-dimethyl-17$\beta$-hydroxy-oestrene in 160 ml acetone is added at 5° C, while stirring, 6.5 ml of a solution of 8N chromic acid according to Jones. The mixture is stirred for 15 minutes, after which the acetone is removed by distillation. After the addition of water the resulting precipitate is filtered off and chromatographed over silicagel to obtain the $\Delta^{5(10)}$-7$\alpha$,18-dimethyl-17-keto-oestrene.

EXAMPLE VIII

Acetylene is bubbled through a solution of 1.75 gm potassium in 13 ml isopropanol and 25 ml benzene for 3 hours. To this solution is added a solution of 3.4 gm $\Delta^{5(10)}$-7$\alpha$,18-dimethyl-17-keto-oestrene in 18 ml ether and 12 ml benzene, after which again acetylene is bubbled through for 3 hours. The mixture is stirred for 15 minutes, after which 25 ml 10 percent H$_2$SO$_4$ is added. The aqueous mixture is extracted with ether and the extract washed, dried and evaporated to dryness, after which the residue is chromatographed over silicagel to obtain the $\Delta^{5(10)}$-7$\alpha$,18-dimethyl-17$\beta$-hydroxy-17$\alpha$-ethynyl-oestrene.

By esterification this compound has been converted into the 17-esters derived from acetic acid, valeric acid, phenylpropionic acid and succinic acid.

EXAMPLE IX

By the method described in Example IV the compound according to Example VIII has been converted into the $\Delta^{5(10)}$-7$\alpha$,18-dimethyl-17$\beta$-hydroxy-17$\alpha$-vinyl-oestrene and the $\Delta^{5(10)}$-7$\alpha$,18-dimethyl-17$\beta$-hydroxy-17$\alpha$-ethyl-oestrene.

By esterification these compounds have been converted into the 17-esters derived from acetic acid, capric acid and stearic acid.

EXAMPLE X

By the method described in Example V the $\Delta^{5(10)}$-7$\alpha$,18-dimethyl-17-keto-oestrene has been converted into the corresponding 17$\beta$-hydroxy-17$\alpha$-methyl and 17$\beta$-hydroxy-17$\alpha$-butyl compounds via a condensation reaction with methylmagnesiumbromide and butylmagnesiumbromide.

EXAMPLE XI

In the same manner as described in the Examples VI AND VII the $\Delta^{5(10)}$-3-keto-7$\alpha$,18,18-trimethyl-17$\beta$-hydroxy-oestrene has been converted into the corresponding 3-desoxo-derivative and the 17-keto compound thereof.

By an ethynylation reaction followed by reductions the $\Delta^{5(10)}$-7$\alpha$,18,18-trimethyl-17keto-oestrene has been converted into the corresponding 17$\beta$-hydroxy-17$\alpha$-ethynyl, 17$\beta$-hydroxy-17$\alpha$-vinyl and 17$\beta$-hydroxy-17$\alpha$-ethyl derivatives.

EXAMPLE XII

A mixture of 60.37 gm $\Delta^4$-3-keto-7$\alpha$,18-dimethyl-17$\beta$-hydroxy-oestrene-17-benzoate, 417 ml acetic acid anhydride, 209 ml acetyl chloride and 21 ml dry pyridine is refluxed for 3 hours, then cooled down and poured into 8 liters ice-water, after which the aqueous mixture is stirred for 1 hour and the crystals formed are filtered off, washed with water containing 1 percent pyridine and evaporated to dryness in vacuo to obtain the $\Delta^{3,5}$-3$\beta$-acetoxy-17$\beta$-benzoyloxy-7$\alpha$,18-dimethyl-oestradiene.

To a solution of 23 gm of this substance in 360 ml tetrahydrofuran and 700 ml 96 percent ethanol is added a solution of 23 gm sodium borohydride in 450 ml 70 percent ethanol, after which dilute hydrochloric acid is added at 0° C. The mixture is evaporated in vacuo till nearly dry to obtain the $\Delta^5$-3$\beta$,17$\beta$-dihyroxy-7$\alpha$,18-dimethyl-oestrene-17-benzoate.

Twenty grams of this compound is dissolved in 50 ml methylene chloride, after which 20 ml thionyl chloride is added dropwise. The mixture is kept at room temperature for 3 hours, poured into ice-water and extracted with methylene chloride. The extract is washed with a sodium bicarbonate solution and then chromatographed over silicagel to obtain the $\Delta^5$-3$\beta$-chloro-7$\alpha$,18-dimethyl-17$\beta$-hydroxy-oestrene-17-benzoate.

To a solution of 22 gm of this substance in 600 ml methanol and 200 ml dioxan is added 15 gm potassium hydroxide in 50 ml water. The mixture is refluxed for 3 hours, evaporated in vacuo till nearly dry, poured into water, extracted with methylene chloride, washed with water, dried, evaporated to dryness and chromatographed over silicagel to obtain the $\Delta^5$-3$\beta$-chloro-7$\alpha$,18-dimethyl-17$\beta$-hydroxy-oestrene.

EXAMPLE XIII

A solution of 18 gm $\Delta^5$-3$\beta$-chloro-7$\alpha$,18-dimethyl-17$\beta$-hydroxy-oestrene-17-benzoate obtained in accordance with Example XII, in 360 ml absolute ether is added to a solution of 18 gm lithium in 510 ml liquid ammonia. The mixture is stirred for 2 hours, after which 60 ml 96 percent ethanol is added, the ammonia evaporated and the residue diluted with ice-water. The aqueous mixture is extracted with ether, washed with water, dried and evaporated to dryness in vacuo, and the residue chromatographed over silicagel to obtain the $\Delta^5$-7$\alpha$,18-dimethyl-17$\beta$-hydroxy-oestrene.

EXAMPLE XIV

By the process described in Example II the compounds according to Example XII and XIII are converted into the corresponding 17-keto compounds.

By the methods described in the previous examples these two 17-keto compounds have been converted into the following compounds:

$\Delta^5$-3$\beta$-chloro-7$\alpha$,18-dimethyl-17$\beta$-hydroxy-17$\alpha$-ethynyl-oestrene $\Delta^5$3$\beta$-chloro-7$\alpha$,18-dimethyl-17$\beta$-hydroxy-17$\alpha$-vinyl-oestrene $\Delta^5$-3$\beta$-chloro-7$\alpha$,18-dimethyl-17$\beta$-hydroxy-17$\alpha$-ethyl-oestrene $\Delta^5$-3$\beta$-chloro-7$\alpha$,18-trimethyl-17$\beta$-hydroxy-oestrene $\Delta^5$-3$\beta$-chloro-7$\alpha$,18-dimethyl-17$\beta$-hydroxy-17$\alpha$7$\alpha$ $\Delta^5$-7$\alpha$,18-dimethyl-17$\beta$-hydroxy-17$\alpha$-ethynyl-oestrene $\Delta^5$-7$\alpha$,18-dimethyl-17$\beta$-hydroxy-17$\alpha$-vinyl-oestrene $\Delta^5$-7$\alpha$,18-dimethyl-17$\beta$-hydroxy-17$\alpha$-ethyl-oestrene $\Delta^5$-7$\alpha$,18-dimethyl-17$\beta$-hydroxy-17$\alpha$-propynyl-oestrene $\Delta^5$-7$\alpha$,18-dimethyl-17$\beta$-hydroxy-17$\alpha$-butadienyl-oestrene.

By esterification 17-acylates have been prepared from these compounds derived from acetic acid, capronic acid, phenylpropionic acid, cyclohexyl butyric acid, capric acid and palmitic acid, and by etherification 17-methyl, 17-propyl, 17-hexyl, 17-methylvinyl and 17-butylvinyl-ethers.

I claim:

1. Novel $\Delta^4$-3-desoxo-19-nor-steroids having the formula:

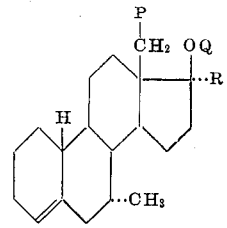

wherein
P is selected from the group consisting of a methyl and an ethyl group,
Q is selected from the group consisting of hydrogen and an acyl group derived from an organic carboxylic acid having one–18 carbon atoms,
R is selected from the group consisting of an alkyl-, alkenyl-, and an alkynyl group having one–six carbon atoms.

2. $\Delta^4$-7$\alpha$,18-dimethyl-17$\beta$-hydroxy-17$\alpha$-ethynyl-oestrene.

3. $\Delta^4$-7$\alpha$,18-dimethyl-17$\beta$-hydroxy-17$\alpha$-ethyl-oestrene.

* * * * *

UNITED STATES PATENT OFFICE
CERTIFICATE OF CORRECTION

Patent No. 3,673,225					Dated June 27, 1972

Inventor(s) Hendrik Paul De Jongh

It is certified that error appears in the above-identified patent and that said Letters Patent are hereby corrected as shown below:

In the heading of the patent insert:

[32] Priority January 30, 1969

[33] Netherlands

[31] 6,901,532

Signed and sealed this 7th day of November 1972.

(SEAL)
Attest:

EDWARD M. FLETCHER, JR.					ROBERT GOTTSCHALK
Attesting Officer					Commissioner of Patents